United States Patent
Klose

(10) Patent No.: US 10,753,866 B2
(45) Date of Patent: Aug. 25, 2020

(54) TERAHERTZ MEASURING APPARATUS AND TERAHERTZ MEASUREMENT METHOD FOR MEASURING A TEST OBJECT BY MEANS OF A TIME-OF-FLIGHT MEASUREMENT

(71) Applicant: INOEX GmbH Innovationen und Ausruestungen fuer die Extrusionstechnik, Melle (DE)

(72) Inventor: Ralph Klose, Melle (DE)

(73) Assignee: INOEX GmbH Innovationen und Ausruestungen fuer die Extrusionstechnik, Melle (DE)

( * ) Notice: Subject to any disclaimer, the term of this patent is extended or adjusted under 35 U.S.C. 154(b) by 106 days.

(21) Appl. No.: 16/310,016

(22) PCT Filed: Jun. 16, 2017

(86) PCT No.: PCT/DE2017/100502
§ 371 (c)(1),
(2) Date: Jan. 18, 2019

(87) PCT Pub. No.: WO2017/215712
PCT Pub. Date: Dec. 21, 2017

(65) Prior Publication Data
US 2019/0331594 A1    Oct. 31, 2019

(30) Foreign Application Priority Data

Jun. 16, 2016  (DE) .................. 10 2016 111 044

(51) Int. Cl.
*G01N 21/3581* (2014.01)
*G01B 11/06* (2006.01)
*G01N 21/952* (2006.01)

(52) U.S. Cl.
CPC ......... *G01N 21/3581* (2013.01); *G01B 11/06* (2013.01); *G01N 21/952* (2013.01)

(58) Field of Classification Search
CPC ... G01N 21/3581; G01N 21/952; G01B 11/06
See application file for complete search history.

(56) References Cited

U.S. PATENT DOCUMENTS

2007/0235658 A1   10/2007   Zimdars et al.
2015/0219571 A1   8/2015   Demers

FOREIGN PATENT DOCUMENTS

WO    2015/073807 A1    5/2015

OTHER PUBLICATIONS

International Search Report of PCT/DE2017/100502, dated Sep. 1, 2017.

(Continued)

*Primary Examiner* — Courtney D Thomas
(74) *Attorney, Agent, or Firm* — Collard & Roe, P.C.

(57) ABSTRACT

The invention relates to a terahertz measuring apparatus (1) for measuring a test object (2) by means of a run-time measurement while determining at least one distance (d1, d2, d3, d4),
said terahertz measuring apparatus (1) comprising:
a terahertz transmitter and receiver unit (3) for emitting terahertz radiation (5) and detecting the terahertz radiation reflected by the test object (2), and
an evaluation unit (12) for determining a run-time of the terahertz radiation and at least one distance of the test object (2),
Hereby, it is provided, that
at least one, preferably several passive terahertz receiver devices (4) are provided the optical axes (C-4) of which are arranged shifted or angled in relation to the optical axis (C-3) of the terahertz transmitter and receiver unit (3)

(Continued)

Figure 4:
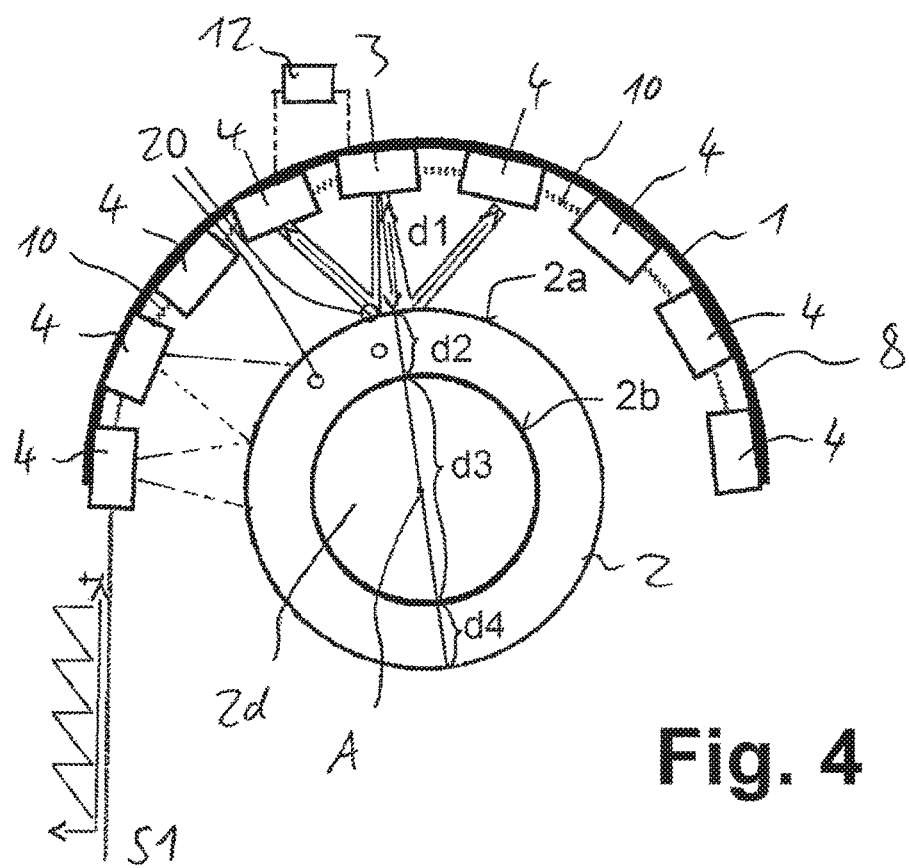

and detect a second reflected terahertz radiation (6b) emitted by the terahertz transmitter and receiver unit (3) and reflected on the test object (2), a data connection (10) for synchronising the terahertz transmitter and receiver unit (3) and the at least one passive terahertz receiver unit (4) by means of a synchronising signal (S1) is provided, with the evaluation unit (12) or the terahertz receiver unit (4) determining a second run-time ($\Delta t3$, $\Delta t4$) and a second distance from the second reflected terahertz radiation (6b) and the synchronising signal (S1).

18 Claims, 2 Drawing Sheets

(56) References Cited

OTHER PUBLICATIONS

J. Hauck et al: "Terahertz Inline Wall Thickness Monitoring System for Plastic Pipe Extrusion", AIP Conference Proceedings, 1593, pp. 86-89 (2014).

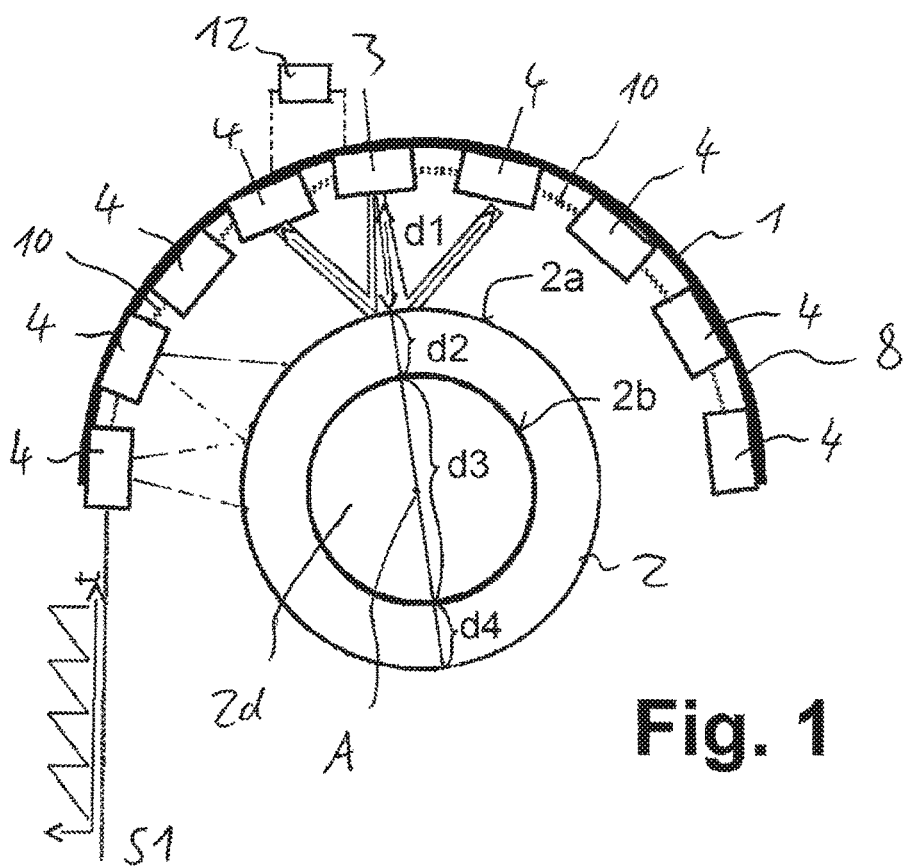
Fig. 1
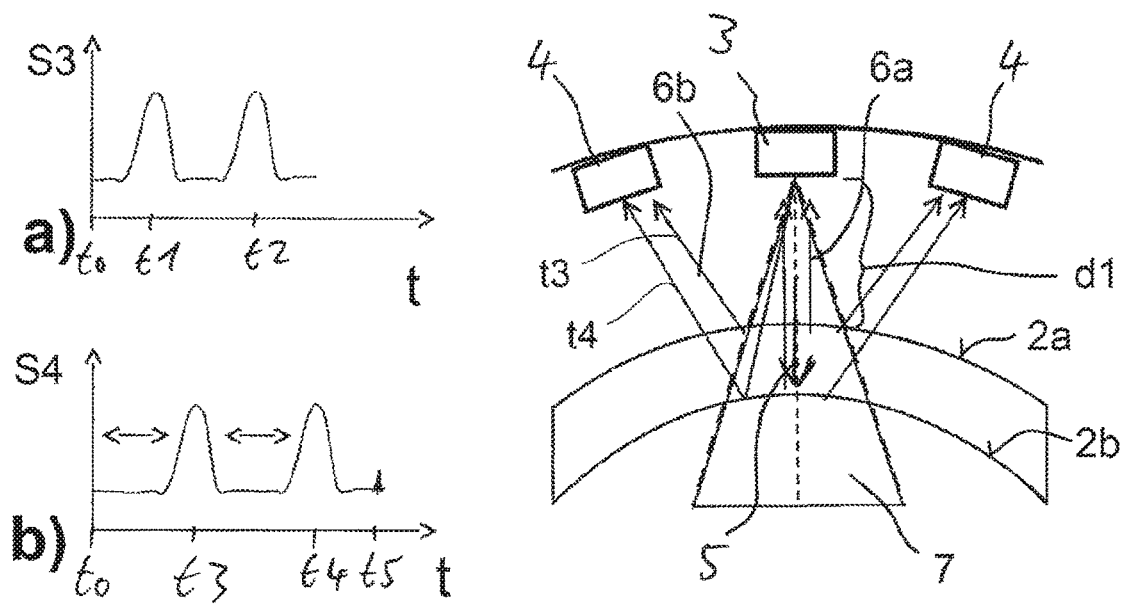
Fig. 3
Fig. 2

TERAHERTZ MEASURING APPARATUS AND TERAHERTZ MEASUREMENT METHOD FOR MEASURING A TEST OBJECT BY MEANS OF A TIME-OF-FLIGHT MEASUREMENT

CROSS REFERENCE TO RELATED APPLICATIONS

This application is the National Stage of PCT/DE2017/100502 filed on Jun. 16, 2017, which claims priority under 35 U.S.C. § 119 of German Application No. 10 2016 111 044.2 filed on Jun. 16, 2016, the disclosure of which is incorporated by reference. The international application under PCT article 21(2) was not published in English.

The invention relates to a Terahertz measuring apparatus and a terahertz measuring method, for measuring a test object by means of a run-time measurement.

In such measuring devices and measuring methods terahertz radiation is emitted from a terahertz transmitter and receiver unit along an optical axis onto a test object, and the radiation reflected back from the test object is detected again by the terahertz transmitter and receiver unit whereby the run-time of the radiation can be determined. Hereby, for example, pulsed radiation can be transmitted and the run-time of the pulses can be measured, or it is possible to transmit frequency modulated radiation with a measurement in the frequency domain, whereby such measuring methods technically correlate with each other or, respectively, can be described as a Fourier transformation in relation to each other. Thus test objects may be measured that are transparent to terahertz radiation, in particular plastics, but also stone materials such as earthenware, porcelain, ceramics, and e.g. paper.

The terahertz radiation is partially reflected an boundary surfaces between materials with differing refraction index, for example, air having a refraction index of $n0=1$, and plastics materials having a refraction index of, for example, about 1.5, so that the radiation reflected perpendicularly on a boundary surface and along the optical axis back to the terahertz transmitter and receiver unit can be detected. When performing the measurement, usually, in the terahertz transmitter and receiver unit the transmitted and the detected reflected radiation are superimposed, and the run-time can be determined from with high precision. Thus, distances to a test object, as well as layer thicknesses of the test objects on boundary surfaces perpendicular to the optical axis can be determined.

Thus, in order to obtain a complete measurement around the entire circumference of the test object, e.g. a pipe, a larger number of terahertz transmitter and receiver units is required which are usually mechanically adjusted in order to fully capture the test object at its surface or its perimeter. Such mechanical adjustments, however, are usually expensive.

The document US 2007/0235658 A1 describes a system for measuring an article, in particular, a piece of luggage, where one or more THz modules generate or detect THz radiation. Radiation may be passed through an articles in a transmission mode or reflected radiation can be detected in a reflection mode. Hereby, a multiplicity of voxels, i.e. a two-dimensional resolution in pixels having specific volumes and signatures is generated which is determined by material properties, in particular, the abortion properties and the refractive index of the THz radiation.

The citation WO 2015/073807 A1 describes the measurement of dielectric layers by means of THz radiation emitted by a transmitter and detected by a receiver. A waveform is put out, and in the detected signal it is detected where the measured wave form corresponds to the model wave form. Hereby, it is possible to determine the thickness of a dielectric layer and to determine a complex refraction index with absorption properties.

Therefore, the invention is based on the object of creating a terahertz measuring apparatus and a terahertz measuring method allowing wide measuring of measured objects with relatively little expenditure.

This task is solved by a terahertz measuring device and a terahertz measuring method according to the independent claims. Preferred further developments are described in the sub-claims.

The terahertz measuring method according to the invention can be carried out, in particular, using a terahertz measuring apparatus according to the invention; the terahertz measuring apparatus according to the invention is, in particular, provided to carry out a terahertz measuring method according to the invention.

Thus, in addition to the terahertz transmitter and receiver unit at least one passive terahertz receiver unit is provided which detects the second radiation transmitted from the terahertz transmitter and receiver unit and reflected on the test object. Hereby, the passive terahertz receiver unit picks up a synchronization signal specifying the time of transmission of the terahertz radiation.

This already brings results in the advantage of allowing a wide measurement of the test object with little expenditure in hardware and relatively little energy, in particular, even with little or no mechanical adjustment of the units at all. It is possible to obtain measurements at non-perpendicular incidence of the THz radiation on den boundary surfaces that may capture large areas of the test object.

Advantageously, the passive terahertz receiver unit or the evaluation unit respectively, when carrying out the evaluation, utilizes data additionally stored relating to a geometric shape, in particular, relative geometric dispositions of the position and alignment of its optical axis as well as the position and alignment of the optical axis of the terahertz transmitter and receiver unit. Such geometric data may be determined in advance by measuring but also, in particular, by way of calibration on a first measuring so that can be utilized subsequently for evaluation purposes.

Advantageously, several terahertz receiver units are provided each of which passively receives the transmitted radiation. For measuring a pipe as the test object, for example, several units may be arranged in a circular arrangement, in particular, e.g. as a semi-circle so that they are able to widely capture the test object by virtue of their overlapping transmission and reception cones or angles respectively. Hereby it is also possible, in particular, to carry out a measurement of the test object over its entire perimeter because the radiation always penetrates a front wall and a back wall of the test object thereby generating measuring signals.

The synchronization signal for specifying the time of transmission, e.g. a trigger pulse or an analogue signal, e.g. saw tooth signal, is output via a data line; it may be output, in particular, directly by the transmitting terahertz transmitter and receiver unit which, thereby, in particular, doubles as a master unit putting out the synchronization signal including the information on the time of transmission to the at least one THz receiver unit serving as slave unit. This allows, in particular, also to create a modular system, e.g. bus system, from units interconnected by data lines which may possibly even be expanded and partially exchanged. Alternatively, a central system, e.g. in a star layout with a central controller unit, is possible. The data connection may be realised via cable or wirelessly.

According to a preferred embodiment each unit of the multiplicity of units my temporarily be terahertz transmitter and receiver unit to thereby determined, for example, as master unit, the transmission time for the other units which are each passive receiver units. Thus, the function of being the master unit or the transmitting unit respectively may change among the units. This achieves an advantage in that very wide measurements are mare possible at little expenditure because differing positions and alignments of the transmitting optical axis are rendered possible at respectively several additionally detected optical axes.

Thus, using little expenditure, wide, in particular, even full perimeter measurements are possible. A wide transmission cone of the transmitting unit and a wide receiving cone of the receiving unit may be used, in contrast to systems detecting merely perpendicular reflections.

The measurement of the test objects can be carried out directly in a continuous process, for example during production or after production of the test object.

Hereby, it is possible to detect distances, i.e. the distance of the test object in relation to the respective units, and also layer thicknesses, for example, a wall thickness, as well as even an interior diameter as layer thickness of a layer of air. In addition, additionally appearing measuring peaks may be detected as impurities.

The THz-measuring methods according to the invention and the THz device according to the invention are advantageous, in particular also for detecting impurities or faults respectively in the test object because, by virtue of the several THz receiver units, large areas of the test object can be detected. Thus, an impurity can be detected as an additional measuring peak which, in particular, cannot be attributed to any ordinary boundary surface. Thus, upon detecting a sufficiently high measuring peak not attributable to any boundary surface, i.e. e.g. upon exceeding a signal threshold, an error signal may be put out.

Hereby, several terahertz transmitter and receiver units can be arranged distributed around the test object or a test object position and each determine a position point set of one or more impurities. The controller and evaluator unit can determine a position and/or size and/or shape of the individual impurities from the several position point sets.

Impurities may be detected between the wall regions or, respectively, between the boundary surfaces. Furthermore, faulty wall regions or boundary surfaces themselves may be classified as impurities. In particular, a non-perpendicular reflection received by a passive receiver unit and not attributable to any regular wall region may be classified as an impurity.

When evaluating the signal amplitudes, a sufficiently high, improper measuring peak may be classified as an impurity if e.g. the signal amplitude exceeds a threshold value. Hereby, the several passive terahertz receiver units may each determine one position point set of one or more impurities so that the location and shape of the impurities can be determined from the several position point sets.

Thus, according to the invention, is it possible to determine—without additional expenditure—in particular, the position, shape, and/or size of the impurities because, preferably, a trigonometric capture from several directions is made possible by the several receiver units.

The terahertz radiation is put out, in particular, at a frequency range between 0.01 THz and 10 THz, e.g. 0.1 to 3 THz. Hereby, in particular, fully electronic transmitter and receiver units as well as receiver units are possible which, thus, generate the terahertz radiation by means of a dipole, e.g. by way of frequency modulation, or even optoelectronic systems for measurements in the time domain, e.g. as pulsed radiation.

The invention is further illustrated by means of the attached drawings in a few embodiment examples. The drawings show:

FIG. 1 a terahertz measuring apparatus according to an embodiment, seen from above, when measuring a pipe as test object;

FIG. 2 an enlarged section from FIG. 1 showing the beam paths;

FIG. 3 diagrams of the measured signal amplitude as a function of the time of the a) terahertz transmitter and receiver unit and b) terahertz receiver units;

FIG. 4 a version when impurities are detected.

A Terahertz measuring apparatus 1 for measuring a test object 2, in this case a plastic pipe 2, comprises a terahertz transmitter and receiver unit 3 serving as master and several terahertz receiver units 4 serving as slaves. The (master) terahertz transmitter and receiver unit 3 transmits terahertz radiation 5, for example in a frequency range between 0.01 THz and 10 THz, in particular 0.1 THz and 3 THz; to that end the terahertz transmitter and receiver unit 3 is designed to be fully electronic, i.e. it generates the terahertz radiation 5 by means of a dipole, e.g. by way of frequency modulation, or optoelectronic, e.g. with measurements in the time domain, e.g. as pulsed radiation.

The terahertz transmitter and receiver unit 3 allows measurement of a run-time $\Delta t$ of the terahertz radiation 5 transmitted at a transmission time t0, which is subsequently reflected by a test object 2 back to the terahertz transmitter and receiver unit 3. In der terahertz transmitter and receiver unit 3 the transmitted THZ radiation 5 is superimposed or mixed respectively with the reflected THZ radiation 6a, so as to determine e.g. a phase difference from this, from which the run-time $\Delta t$ of the transmitted terahertz radiation 5 can thus be determined precisely.

FIG. 3a shows the recorded signal amplitude S3 of the terahertz transmitter and receiver unit 3 as a function of the time t when measuring the front wall region of the plastic pipe 2: firstly, the transmitted terahertz radiation 5 is partially reflected on the outside 2a of the plastic pipe 2 because a transition happens from the environment, for example, air having a refraction index n0=1, to the plastics material of the test object 2 having, for example, a refraction index n2=1.5 for usual plastics materials. Thus, at the point in time t1 a first measuring peak is detected. Subsequently, the transmitted terahertz radiation 5 passes through the wall of the test object 2 and is again partially reflected on der inner surface 2b when transitioning from the plastics material to air whereby the reflected terahertz radiation 6 is being reflected back through plastics material of the test object 2 to the terahertz transmitter and receiver unit 3. Subsequently, knowing the refraction index n2, the distance between the outer surface 2a and the inner surface 2b can be determined from the time difference $\Delta t=t2-t1$.

Hereby, the incidence of the terahertz radiation 5 onto the outer surface 2a and the inner surface 2b is perpendicular so that the determined distance d(t2-t1) actually represents the perpendicular distance d2 between outer surface 2a and inner surface 2b and, thereby, the wall diameter d1. Thus, in the case of multi-layer test objects as the plastic pipe 2 one single measurement is sufficient to detect the several layer thicknesses of successive layers with differing refraction indexes. Thus, according to FIG. 1, it is possible to determine first a distance d1 from the terahertz transmitter and receiver unit 3 to the outer surface 2a, then the layer thickness d2 of the front wall region as the distance between the outer surface 2a and the inner surface 2b, further the interior diameter of the pipe as the layer thickness d3 of the central air gap, i.e. of the interior space 2d, and subsequently the layer thickness d4 of the opposite wall region as the distance between inner surface 2b and outer surface 2a on that side.

The signal amplitude S3 may be represented in FIG. 3 depending on the emitted THz radiation 5 as a function of the time or frequency whereby time dependencies and frequency dependencies can be converted into each other by means of a Fourier transformation.

Further, the terahertz receiver units 4, too, detect the terahertz radiation 6b emitted by the terahertz transmitter and receiver unit 3 and reflected on the test object 2, i.e. with this measurement they are designed as purely passive without actively emitting terahertz radiation. The optical axes C-3 of the terahertz receiver units 4 are arranged in the circumferential direction around the test object 2, i.e. in a circular manner, for example in a semi-circle, mounted on an outer frame 8 which is designed concentric in relation to a symmetry axis A of the entire Terahertz measuring apparatus 1. Thus, in this ideal arrangement, all units 3, 4 are each designed such that their optical axes C-4 and C-3 run through the symmetry axis A.

The terahertz transmitter and receiver unit 3 emits the terahertz radiation 5 for example, according to FIG. 2, in a sufficiently large emitted cone or, respectively emitted spatial angle 7 about its optical axis C-3 so that a part of the emitted radiation 5 does not impinge perpendicularly onto the boundary surfaces 2a, 2b and is correspondingly laterally reflected away so that it can be detected as second reflected THz radiation 6b by one of the passive terahertz receiver units 4.

The terahertz transmitter and receiver unit 3 is connected to the passive terahertz receiver units 4 via a data connection 10 through which the passive terahertz receiver units 4 can be synchronised with the terahertz transmitter and receiver unit 3. Thus, the time of transmission t0 can be communicated as information to the passive terahertz receiver units 4 so that run-time-measurements can also be carried out by the passive terahertz receiver units 4: the terahertz receiver units detect the run-time of the terahertz radiation, which is emitted as terahertz radiation 5 from the terahertz transmitter and receiver unit 3, reflected on the test object 2, and subsequently detected as second reflected terahertz radiation 6b by a terahertz receiver unit 4, as shown as a signal amplitude S4 in FIG. 3b, whereby e.g. at time t3 the reflection on the outer surface 2a and at time t4 on the inner surface 2b are detected.

The data connection 10 can be designed by way of a signal wire or a cable system respectively, for example a bus or radial line system, or alternatively as a radio signal and thereby wirelessly. Hereby, various synchronising signals S1 may be communicated. In accordance with the general representation in FIG. 1, for example, the synchronising signal S1 in a fully electronic terahertz system may be in the form of a voltage edge, for example as a saw tooth voltage value, or also as a trigger pulse, by means of which the terahertz transmitter and receiver unit 3 generates its frequency modulation.

Thus, because the passive terahertz receiver units 4 pick up reflected terahertz radiation 6b that is being reflected not perpendicularly from the respective boundary surface 2a or 2b, at first, a non-perpendicular distance d(t4–t3) of the boundary surfaces 2a, 2b in relation to each other and to the passive receiver units 4 is determined. According to FIG. 2, however, the determined distances d(t4–t3), that can be attributed to the measuring peaks at t4 and t3, are defined by the geometric arrangement of the terahertz transmitter and receiver unit 3 and the respective receiving receiver unit 3 so that this geometric design can be taken into account when determining distances. In an ideal arrangement, the units 3, 4 have their optical axes C-3 and C-4 aligned to the common symmetry axis A so that even-legged triangles ensue when the pipe 2 is in a central position. Because a multiplicity of THz receiver units is provided it is also possible to measure test objects 2 offset against the symmetry axis A—for example temporarily—so that a pipe axis B is not equal to the symmetry axis A. Owing to the multiplicity of individual measurements, where the emitted terahertz radiation 5 is measured not only by the terahertz transmitter and receiver unit 3 itself but also by the several passive receiver units 4, any incorrect positioning can be detected more precisely.

Preferably, the terahertz measuring apparatus 1 from FIGS. 1 and 2 may first be calibrated determining the exact two-dimensional geometric position of the units 3, 4 in relation to each other and making it known for purposes of conducting following measurements.

Hereby, the terahertz transmitter and receiver unit 3 may be connected together with the passive receiver units 4 to a common evaluation device 12, whereby said evaluation device 12 may even be disposed, for example, in the terahertz transmitter and receiver unit 3 itself.

As indicated in FIG. 3b) at the point in time t5, impurities or faults respectively in the test object 2 can be detected precisely because, due to the several THz receiver units 4 large areas of the test object 2 can be detected, even between the boundary surfaces 2a and 2b. Thus, an impurity can be detected as an additional measuring peak.

In accordance with a particularly preferred embodiment, each terahertz receiver unit 4 may serve as a master terahertz transmitter and receiver unit 3. Thus, for example, circumferential measurements are made possible in which several or, respectively, a multiplicity of transmitter and receiver units, hereby, according to FIG. 1, nine terahertz transmitter and receiver units 3, successively carry out such measurements in such a way that each of them temporarily serves or acts respectively as terahertz transmitter and receiver unit 3 and the others as passive receiver units 4. Thus, the measurements may, for example, be conducted in a circular sequence with sequential time intervals.

According to FIG. 4, in the test object 2 impurities 20 are detected on or between the boundary surfaces, i.e. also in or on the test object 2. Such impurities may, in particular, be detected as additional measuring peaks in den signal amplitudes, i.e. between the measuring peaks of the proper boundary surfaces 2a, 2b. Thus, the impurities 20, can be determined, in particular, in the signal amplitudes S4 of the passive receiver units 4 whereby it may be tested e.g. whether additional measuring peaks determined exceed a threshold value and, thus, constitute relevant impurities.

It is also possible, in particular, to perform a trigonometric detection of the impurities 20 whereby the passive receiver units 4 each supply position point sets of the impurities and e.g. the shape and/or size and/or position of the impurities being determined from these.

The invention claimed is:

1. A terahertz measuring apparatus (1) for measuring a test object (2) by means of a run-time measurement while determining at least one distance (d1, d2, d3, d4), said terahertz measuring apparatus (1) comprising:

a terahertz transmitter and receiver unit (3) for emitting terahertz radiation (5) and detecting the terahertz radiation (6a) reflected from said test object (2), an evaluation unit (12) for determining a run-time (Δt) of the terahertz radiation and at least one distance (d1, d2, d3, d4) of said test object (2) from the determined run-time (Δt), wherein at least one passive terahertz receiver device (4) is provided, the optical axis (C-4) of which is arranged shifted or angled in relation to the optical axis (C-3) of said terahertz transmitter and receiver unit (3) and a second terahertz radiation (6b) emitted from said terahertz transmitter and receiver unit (3) and reflected on said test object (2) is detected, a data connection (10) is provided for synchronising said terahertz transmitter and receiver unit (3) and the at least one passive terahertz receiver unit (4) by means of a synchronising signal (S1), said evaluation unit (12) or said terahertz receiver unit (4) determining a second run-time (Δt3, Δt4) and a second distance from said second reflected terahertz radiation (6b) and said synchronising signal (S1), whereby several passive terahertz receiver units (4) are being arranged around a measuring region for said test object (2).

2. The terahertz measuring apparatus (1) according to claim 1, wherein said evaluation unit (12) or said passive terahertz receiver device (4) utilizing store geometric data or distance date relating to the arrangement of said terahertz transmitter and receiver unit (3) and said passive terahertz receiver units (4) for determining said second distance.

3. The terahertz measuring apparatus (1) according to claim 1, wherein the several passive terahertz receiver units (4) are arranged around the measuring region for said test object, for the purpose of measuring the entire perimeter of said test object (2).

4. The terahertz measuring apparatus (1) according to claim 1, wherein said terahertz transmitter and receiver unit (3) and said several passive terahertz receiver units (4) are arranged in a circular manner, for example, forming a semi-circle, about a symmetry axis (A) and their optical axes (C-3, C-4) run through said symmetry axis (A) or intersect in the symmetry axis (A), in particular, in a common plane.

5. The terahertz measuring apparatus (1) according to claim 1, wherein said passive terahertz receiver units (4) pick up terahertz radiation which has been reflected not on proper boundary surfaces reflected, and said evaluation unit (12) or die terahertz receiver unit determines measuring peaks in the signal amplitudes (S4) of said passive terahertz receiver units (4) that do not correspond to the proper boundary surfaces as impurities, in particular, while determining the position and/or shape and/or size of the impurities.

6. The terahertz measuring apparatus (1) according to claim 1, wherein said data connection (10) runs between said units (3, 4) or from a central evaluation unit (12) to said units (3, 4).

7. The terahertz measuring apparatus (1) according to claim 6, wherein said data connection (10) runs always between two adjacent units (3, 4; 4, 4), for example as a bus system.

8. The terahertz measuring apparatus (1) according to claim 1, wherein the emitting terahertz transmitter and receiver unit (3) puts out said synchronising signal (S1), for example as a trigger signal for specifying the time of transmission (t0) or as an analogue saw tooth signal, said passive terahertz receiver units (4) determining the time of transmission (t0) from said synchronization signal (S1).

9. The terahertz measuring apparatus (1) according to claim 1, wherein said terahertz transmitter and receiver unit (3) is designed as master unit and said at least one passive terahertz receiver unit (4) as slave unit.

10. The terahertz measuring apparatus (1) according to claim 1, wherein said terahertz transmitter and receiver unit (3) emits terahertz radiation in a frequency range between 0.01 and 10 THz, in particular 100 GHz and 3 THz, in particular, fully electronically by means of a dipole.

11. A terahertz measuring method for measuring a test object (2), in particular, a pipe (2), wherein a terahertz transmitter and receiver unit (3) emits terahertz radiation (6a) along its optical axis (C-3) and detects terahertz radiation (6a) reflected from said test object (2), whereby at least one time difference (Δt) is determined from a run-time measurement wherein a distance (d1, d2, d3, d4) is determined, from the time difference (Δt), further, at least one passive terahertz receiver unit (4), the optical axis (C-4) of which is arranged shifted or angled in relation to the optical axis (C-3) of said terahertz transmitter and receiver unit (3), receives second terahertz radiation (6b) emitted by said terahertz transmitter and receiver unit (3) and reflected on said test object (2) and determines at least one second distance from this, whereby a synchronising signal (S1) for specifying the time of transmission (t0) is utilized for determining said second distance whereby several passive terahertz receiver units (4) are being arranged around a measuring region for said test object (2).

12. The terahertz measuring method according to claim 11, wherein said synchronising signal (S1) is transmitted by said terahertz transmitter and receiver unit (3) to said terahertz receiver unit (4).

13. The terahertz measuring method according to claim 12, wherein said terahertz transmitter and receiver unit (3) puts out said synchronising signal (S1) to said several terahertz receiver units (4) each for specifying the time of transmission (t0), and said terahertz receiver unit (4) determines, from the time of transmission (t0) and from the signal amplitude (S4) of the second reflected radiation, run-times (Δt3, Δt4) and, from these, geometric distances using stored date relating to a geometric arrangement, in particular, a distance and/or angle of the optical axes (C-3, C-4) of said terahertz transmitter and receiver unit (3) and said terahertz receiver unit (4) in relation to each other.

14. The terahertz measuring method according to claim 11, wherein at least two, in particular, more than two terahertz transmitter and receiver units (3) are synchronised with each other, whereby, successively, terahertz-measurements are carried out in which always one of said terahertz transmitter and receiver units (3) actively emits terahertz radiation (5) and the other terahertz transmitter and receiver units, as passive terahertz receiver units (4), measure reflected radiation, and, subsequently, another of said terahertz transmitter and receiver units (3) emits terahertz radiation (5) and the at least one other terahertz transmitter and receiver unit detects as passive terahertz receiver unit (4).

15. The terahertz measuring method according to claim 11, wherein distances to boundary surfaces or between boundary surfaces of said test object (2) are determined from the measurements of said first and/or second reflected terahertz radiation (6*a*, 6*b*) and, further, additionally, distances of impurities in or on said test object (2) are determined from the detected second terahertz radiation (6*b*), in particular, from reflected terahertz radiation which has been reflected not on proper boundary surfaces of said test object.

16. The terahertz measuring method according to claim 15, wherein said terahertz receiver units (4) each determine a position point set of one or more impurities (10, 110), and a position and/or size and/or shape of the individual impurities (10, 110) is determined from the several position point sets.

17. The terahertz measuring method according to claim 11, wherein the run-time measurement are carried out as measurements in the time domain, e.g. using pulsed terahertz radiation, or as measurements in the time frequency domain, e.g. using frequency modulation.

18. The terahertz measuring method according to claim 11, wherein a pipe is measured as the test object (2) which is being conveyed perpendicularly to a detection determined by the terahertz radiation, in particular, continuously in a continuous process, with said pipe (2) being measured in its entire perimeter.

* * * * *